United States Patent
Farkas

(10) Patent No.: US 6,452,352 B1
(45) Date of Patent: Sep. 17, 2002

(54) METHOD OF CURRENT INTERACTION IN AN ELECTRIC MOTOR DRIVE SYSTEM HAVING A LOAD-DEPENDENT CURRENT GENERATING SYSTEM

(75) Inventor: Kenneth James Farkas, Dearborn, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 09/705,236

(22) Filed: Nov. 2, 2000

(51) Int. Cl.7 .................................................. H02P 7/00
(52) U.S. Cl. ...................... 318/433; 318/432; 318/140; 318/139; 318/151
(58) Field of Search ................................ 318/432, 433, 318/139, 140, 151

(56) References Cited

U.S. PATENT DOCUMENTS

| | | | |
|---|---|---|---|
| 3,686,549 A | | 8/1972 | Winebrener ................. 318/139 |
| 4,931,947 A | | 6/1990 | Werth et al. ................. 364/492 |
| 5,389,825 A | | 2/1995 | Ishikawa et al. ............ 304/10.1 |
| 5,532,573 A | * | 7/1996 | Brown et al. ................. 322/22 |
| 5,583,411 A | * | 12/1996 | Kusano et al. .............. 318/376 |
| 5,646,852 A | | 7/1997 | Lorenz et al. ........ 364/431.051 |
| 5,678,647 A | * | 10/1997 | Wolfe et al. ................ 180/65.3 |
| 5,808,428 A | * | 9/1998 | Ito et al. ..................... 318/139 |
| 5,808,448 A | * | 9/1998 | Naito .......................... 322/13 |
| 5,847,520 A | | 12/1998 | Theurillat et al. .......... 318/139 |
| 5,877,600 A | * | 3/1999 | Sonntag ..................... 180/65.3 |
| 5,898,282 A | * | 4/1999 | Drozdz et al. ............. 180/65.4 |
| 5,964,309 A | | 10/1999 | Kimura et al. ............. 180/65.8 |
| 5,991,670 A | * | 11/1999 | Mufford et al. ............ 180/65.1 |
| 5,992,670 A | | 11/1999 | Mufford et al. ............... 701/22 |
| 6,124,645 A | * | 9/2000 | Jones et al. ................... 290/10 |
| 6,158,537 A | * | 12/2000 | Nonobe ...................... 180/65.1 |
| 6,242,873 B1 | * | 1/2001 | Drozdz et al. .............. 317/138 |
| 6,255,008 B1 | * | 7/2001 | Iwase ......................... 180/65.3 |

FOREIGN PATENT DOCUMENTS

| | | |
|---|---|---|
| EP | 0 782 209 A1 | 7/1997 |
| EP | 1 084 895 A1 | 3/2001 |

* cited by examiner

*Primary Examiner*—Robert E. Nappi
*Assistant Examiner*—Rita Leykin
(74) *Attorney, Agent, or Firm*—Seed IP Law Group PLLC

(57) ABSTRACT

This invention provides a process for determining a desired torque (load) value for a load-dependent current generating system, such as a fuel cell system, in an electric vehicle. The process calculates load based on various driver demands such as accelerator position, brake position, Key on/off, Gear selector position, and system component temperatures. Additionally, the process considers the amount of current available from the load-dependent current generating system and matches that current to the current drawn by the electric motor. The process can be applied to a direct current (DC) electric traction motor or an alternating current (AC) induction motor.

12 Claims, 4 Drawing Sheets

METHOD OF CURRENT INTERACTION IN AN ELECTRIC MOTOR DRIVE SYSTEM HAVING A LOAD-DEPENDENT CURRENT GENERATING SYSTEM

BACKGROUND OF THE INVENTION

1. Field of Invention

The present invention relates generally to a control system for a vehicle with an electric motor drive system having a load-dependent current generating system (such as a fuel cell system) as the power source, and specifically to a method and system to identify the amount of Direct Current (DC) bus current needed to drive the electric motor based on driver demand, while controlling the actual amount of DC bus current drawn to match the amount of DC bus current made available from the load-dependent current generating system.

2. Discussion of the Prior Art

The need to reduce fossil fuel consumption and pollutants from automobiles and other vehicles powered by an internal combustion engine (ICE) is well known. Vehicles powered by alternative energy sources are under development. For example, vehicles with battery powered electric traction motors are well known in the prior art. Other electric powered motor vehicles are also known having load-dependant current generators. An example of such a load-dependant system is a fuel cell system.

Fuel cells generate electrical power through an electrochemical reaction of a fuel and oxidant, such as hydrogen and oxygen. Water is the product of the electrochemical reaction in a fuel cell utilizing hydrogen and oxygen, a product that is easily disposed. See generally, U.S. Pat. No. 5,991,670 (Mufford et al. 1999).

The desirability of an electric motor powered vehicle is clear. Nevertheless, there remains substantial room for development of ways to control these vehicles. For example, in a typical battery powered electric vehicle, the electric motor drive system draws current from the battery as needed to power the electric motor. Battery controls are typically put into place to assure the electric motor drive system does not exceed various limits. Such limits can include the maximum current drawn from the battery, the minimum voltage the battery can be lowered while the motor draws current, the maximum current to charge the battery, and the maximum voltage the battery can be raised while charging.

In some control systems, constant values are used for these limits. For most vehicle operating conditions, the controls are not activated because these limits are rarely reached. In short, the electric motor drive system draws current from the battery in an "open-loop" fashion.

A fuel cell power source, or other load-dependent current generators, presents a more complex challenge. Here, the electric motor drive system can no longer draw current in the "open-loop" fashion described above. Controls associated with these types of systems are known in the prior art. Optimally, these controls should identify how much DC bus current the load ("motor") requires based on various driver demands given a specific command of Iq (or torque), and limit the load to the amount of current the fuel cell system (FCS) identifies is available. In other words, the controls must provide a "current command" to the FCS, that is used by the FCS to adjust its power output, resulting in an instantaneous "current available," that is provided back to the controls for matching the actual DC bus current drawn by the load.

Problems, or undesirable effects, result when the actual current drawn by the load does not draw the amount of "current available." First, if the actual DC bus current drawn by the load is more then what the FCS makes available, the resulting high voltage DC bus created by the FCS will drop in an undesired manner, that is, it may drop to lower than the FCS has anticipated, causing problems within the FCS. Second, if the actual DC bus current drawn by the load is less then what the FCS makes available, the FCS may begin to overheat and/or the overall system efficiency will decrease.

In summary, the fuel cell system is not "load following" like a battery. The system requires an accurate method to determine DC bus current needs, and requires the load (the electric motor drive) to use the available DC bus current.

Simple, yet sub-optimal, control systems for fuel cell powered electric drive vehicles are known in the prior art. Sonntag, U.S. Pat. No. 5,877,600, discloses a method for determining the amount of DC bus current needed by the electric motor drive system, and provides this amount to the FCS to control the amount of power it generates. The only stated variable used in making load determination is accelerator pedal position. Additionally, this patent does not provide a method for the controller of the load to track, or follow, the amount of DC bus current available.

Sonntag also does not include a method to determine the maximum current available from the fuel cell system. Without this important determination, the electric motor drive system could potentially request more current than what the fuel cell system could possibly make available, leading to potential problems within the FCS.

SUMMARY OF THE INVENTION

Accordingly, the object of the present invention is to develop a more precise method and system for the controller of an electric motor ("load") to accurately determine the amount of DC bus current required from a load-dependent current generating system, such as a fuel cell, to operate the electric motor based on various vehicle inputs such as accelerator position, brake position, Key on/off, Gear selector position, and various component temperatures.

It is a further object of the present invention to use the monitored DC bus current drawn by any electric motor in a load-dependent current generating system to assure that the DC bus current drawn by the motor matches the amount of available DC bus current.

It is a further object of the present invention to use the monitored DC bus current drawn specifically by an AC induction electric motor in a load-dependent current generating system to assure that the DC bus current drawn matches the amount of available DC bus current.

DETAILED DESCRIPTION OF PREFERRED EMBODIMENT

The present invention generally relates to vehicle with an AC or DC electric motor drive and a load-dependent current generating system, such as a fuel cell system. Although a fuel cell system is described in the preferred embodiment, the present invention relates to any electric powered vehicle with a load-dependent current generating system.

Figure 1:
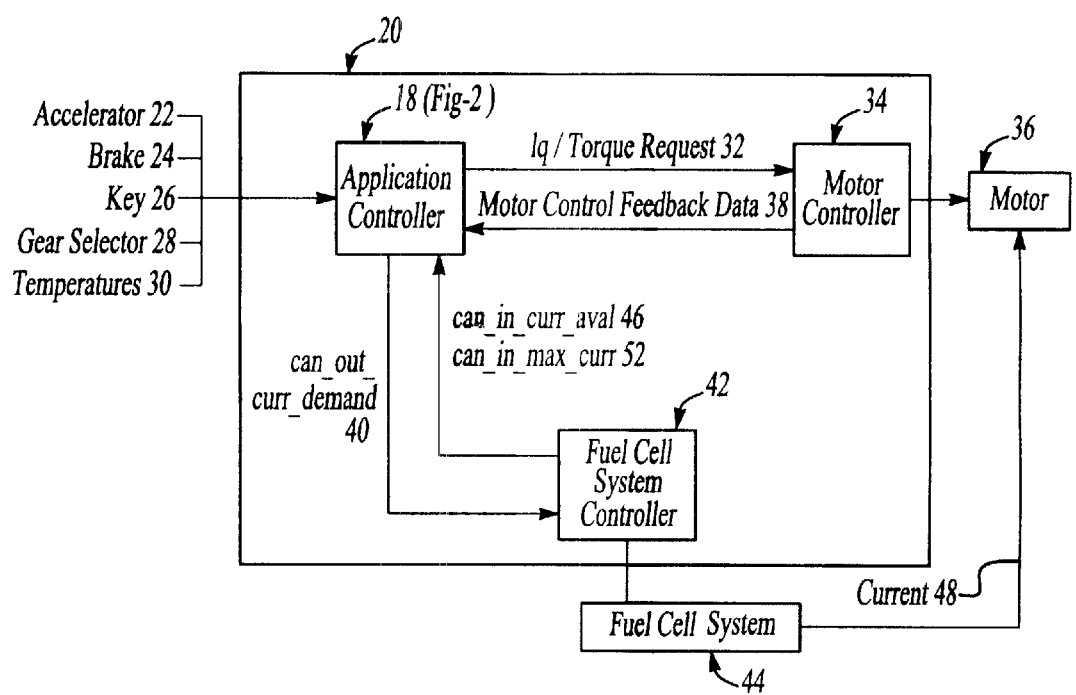
FIG. 1 illustrates the general vehicle system controls to the fuel cell system using any electric traction motor.

FIG. 1 is a diagram of the major components of the preferred fuel cell embodiment of the present invention utilizing any general electric traction motor. Driver demand is determined by an application controller 18 within a vehicle system control ("VSC") 20 receiving output of an accelerator position sensor 22, a brake position sensor 24, a key on/off sensor 26, a gear selection sensor 28, and various system temperature sensors (temperatures) 30. Other system limitations and conditions may also be considered in determining the driver demand.

The application controller 18 outputs an Iq/torque request 32 to a motor controller 34 that accordingly commands a vehicle's electric traction motor 36. The application controller 18 also receives motor controller feedback data 38 from the motor controller 34. The motor controller 34 is responsible for carrying-out the torque command of the application controller 18 in a fast, smooth, and efficient manner, for the type of motor 36 utilized by the system.

Based on driver demand, the application controller 18 also outputs a can_out_curr_demand 40 (the desired current command to the fuel cell system 44) to a fuel cell system controller 42, that accordingly commands a vehicle's fuel cell system 44. The application control 18 also receives can_in_curr_aval 46 and can_in_max_curr 52 from the fuel cell system controller 42. The can_in_curr_aval 46 and can_in_max_curr 52 inputs to the application controller 18 from the fuel cell system controller 42 represent the maximum amount of current 48 the fuel cell system 44 is capable of providing (can_in_max_curr 52), and the instantaneous amount of current 48 available for use (can_in_curr_aval 46).

The fuel cell system controller 42 is responsible for control of the fuel cell system 44. Namely, this is to command the fuel cell system 44 to provide the requested amount of current 48 (at the system rated voltages) to the electric motor 36.

In summary, as shown in FIG. 1, the essential output from the application controller 18 to the fuel cell system controller 42 is the current demand, can_out_curr_demand 40. The essential output from the application controller 18 to the motor controller 34 is the amount of torque requested, Iq/torque request 32. The essential inputs to the application controller 18 from the motor controller 34 being various motor controller feedback data 38. The essential inputs to the application controller 18 from the fuel cell system controller 42 being the amount of current 48 the fuel cell system 44 is capable of providing (can_in_max_curr 52), and the instantaneous amount of current 48 available for use (can_in_curr_aval 46). Additionally, when the Key sensor 26 senses a Key-off position, the Application controller 18 assures that zero current 48 is being demanded when the electric motor drive system 36 is off, or disabled.

Figure 2:
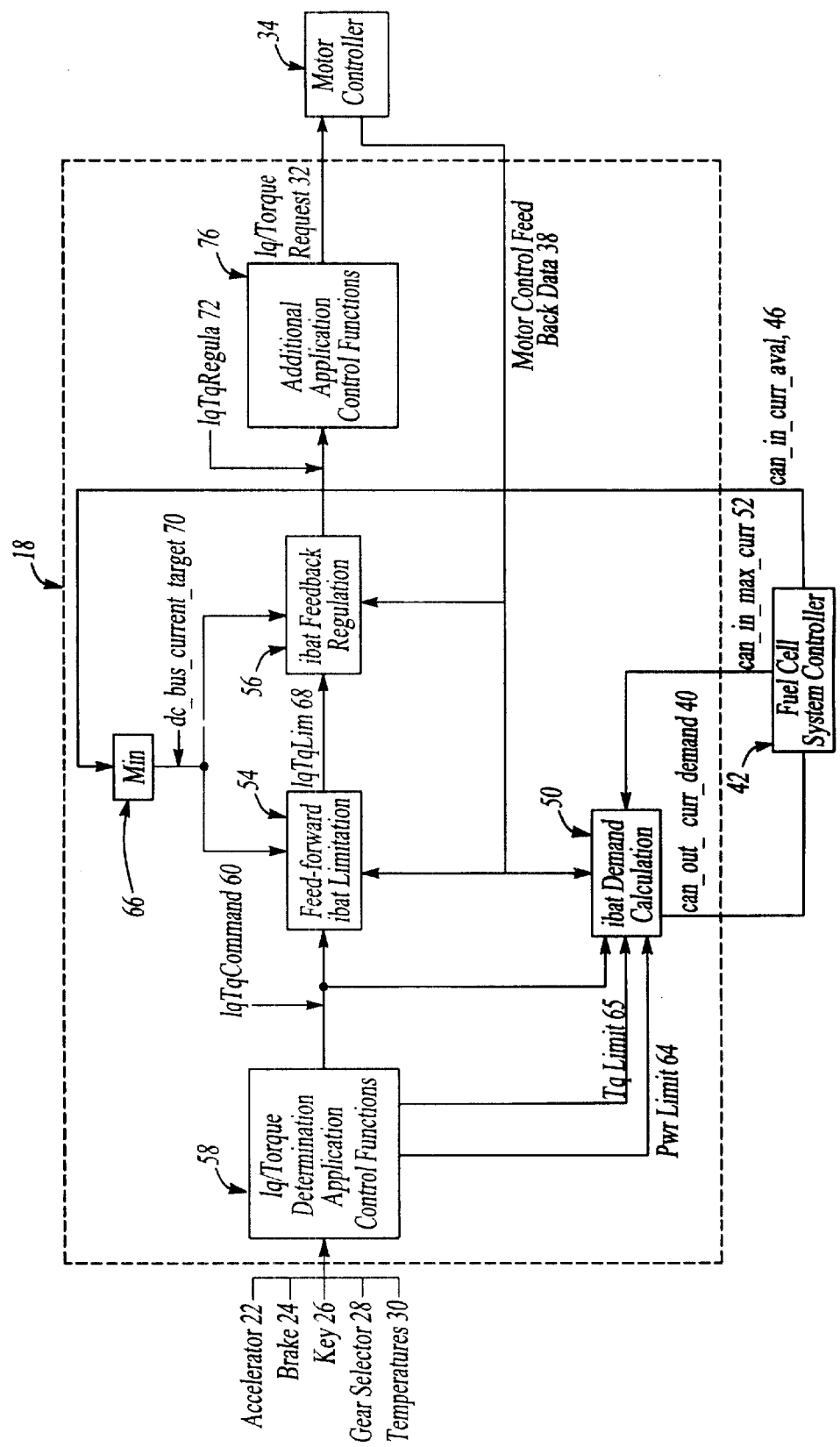
FIG. 2 illustrates the detail of the application controls of FIG. 1.

Given this context, the scope of the invention is contained within the application controller 18 and is more clearly illustrated in FIG. 2. In general, within the application controller 18, an Iq/torque determination application control function 58 receives the output of the various driver demand sensors described above. The Iq/torque determination application control function 58 outputs a PwrLimit 64 and TqLimit 65 to an ibat demand calculation 50, and an IqTqCommand 60 to a feed-forward ibat limitation 54 and the ibat demand calculation 50.

The ibat demand calculation 50 also receives motor control feedback data 38 and the can_in_max_curr 52 to generate the correct can_out_curr_demand 40 (DC bus current demand).

A feed-forward ibat limitation 54 and an ibat feedback regulation 56 deal with assuring the electric motor 36 draws the amount of current 48 the fuel cell control system 42 makes instantaneously available. This is accomplished by the can_in_curr_val 46 inputting to a minimizer 66. Additionally, the IqTqCommand is also input to the feed-forward ibat limitation 54.

The feed-forward ibat limitation 54 is used to clamp IqTqCommand 60 so that its output, IqTqLim 68, is a value that will cause the actual current 48 drawn to be "close" to the lesser of either the fuel cell system's latest value of instantaneous DC current available, can_in_curr_aval 46, or the DC current commanded to the fuel cell control system 42, can_out_curr_demand 40. (The lesser of the two values is taken because it is expected that can_in_curr_aval 46 will, in time, lag can_out_curr_demand 40; or, if the fuel cell system 42 provides too high a value for potentially some failure reason. This assures the motor 36 does not generate more iq or torque than what the vehicle operator is requesting.)

In FIG. 2, the lesser of these two values from the minimizer 66 is identified as dc_bus_current_target 70. The clamp value is generated using dc_bus_current_target 70 and the motor control feedback data 38.

The value, IqTqLim 68, is then regulated by a Proportional-Integral (PI) controller in ibat feedback regulation 56, creating the value IqTqRegula 72, so that an actual DC bus current feedback value, dc_bus_current_fb 86 (FIG. 3) matches the inputted dc_bus_current_target 70. The essential purpose of the ibat feedback regulation 56 block is to correct any inaccuracies generated by the feed-forward ibat limitation 56 used upstream in the processing chain, or any current level shift generated by processing blocks downstream in the processing chain.

The generated value, IqTqRegula 72, is then passed to, and processed by, additional application controller functions 76, such as oscillation dampening functions, prior to being passed to the Motor Controller 34 as the overall iq/torque request.

Figure 3:
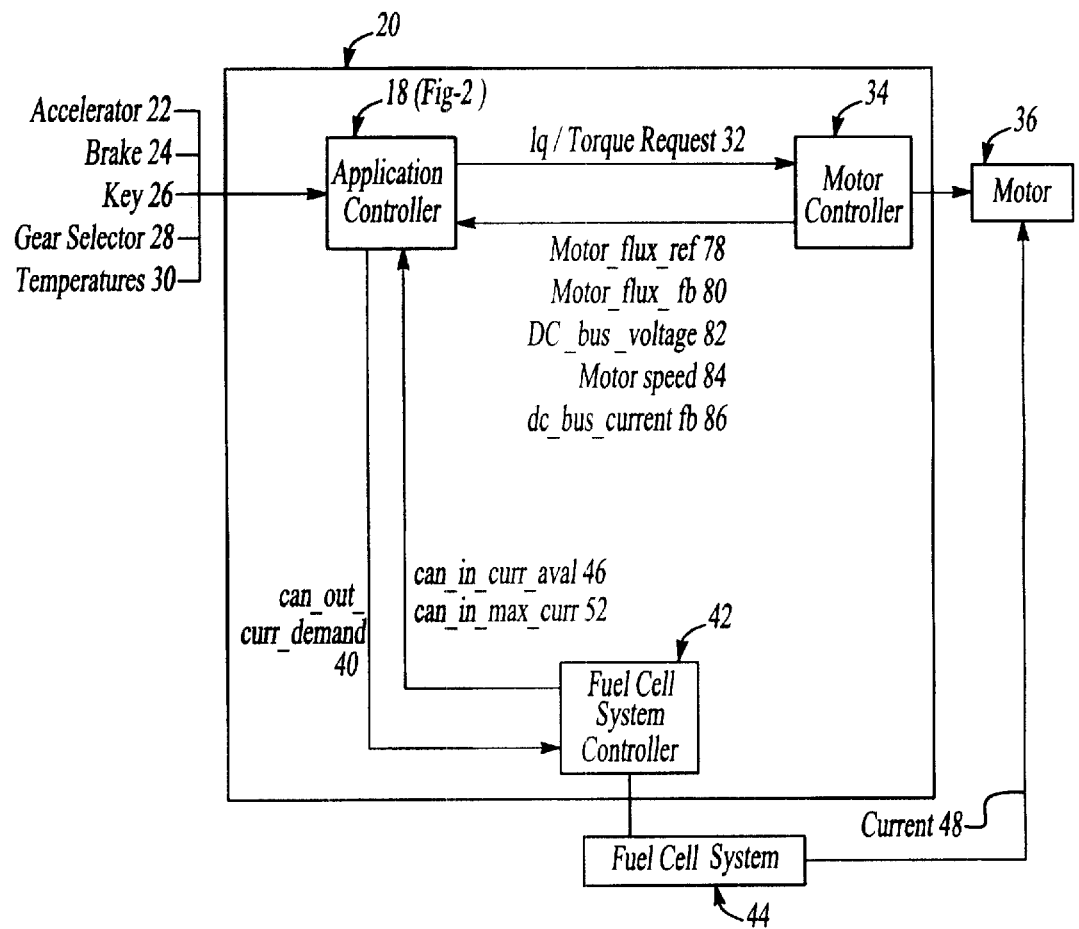
FIG. 3 illustrates the general vehicle system controls to fuel cell system using specifically an AC induction motor.

FIG. 3 illustrates a more specific embodiment of the present invention where the motor 36 is an alternating current (AC) induction motor. This figure is the same as FIG. 1 except that the motor control feedback data 38, from the motor controller 34 to the application controller 18, is specified with more particularity. Here the motor control feedback data 38 include motor_flux_ref 78 (desired magnetic field strength), motor_flux_fb 80 (calculated actual magnetic field strength), DC_bus_voltage 82 (voltage of DC bus measured at the controller), motor speed 84, and DC_bus_current_fb 86 (calculation of DC bus current drawn by the controller of the motor).

Figure 4:
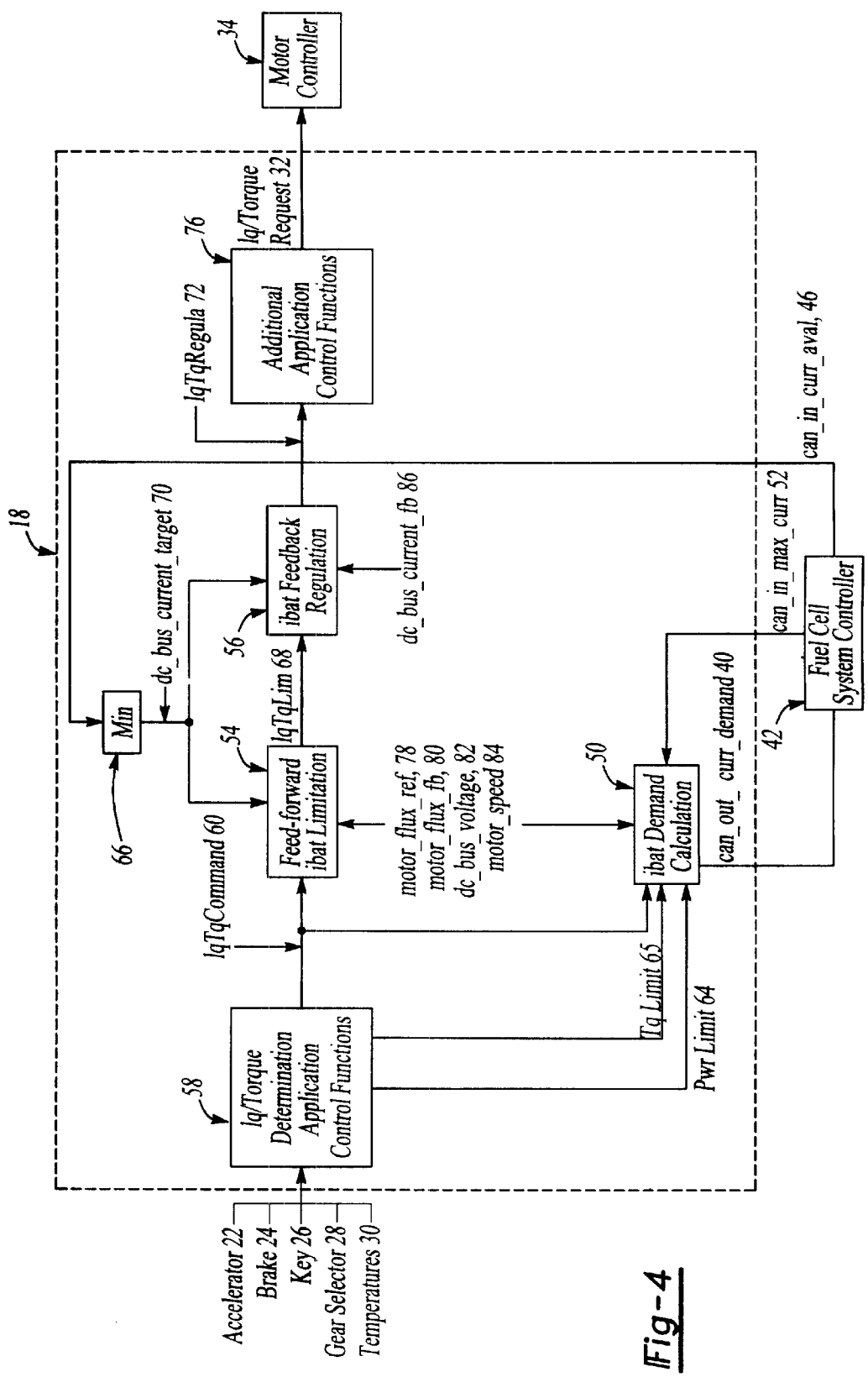
FIG. 4 illustrates the detail of the application controls of FIG. 3.

Similarly, FIG. 4 illustrates the application controller 18 for an AC induction motor vehicle, and is the same as FIG. 2 except that it now adds detail where the specific data from the motor controller 34 is used.

Demonstration calculations for an AC induction motor 36 system are possible using the specific motor control feedback data 38 illustrated in FIGS. 3 and 4. The calculations and logic for the ibat Demand Calculation 50 are:

can-out-curr-demand 40=Minimum(can_in_max_curr 52, TqPwrLimit, Command1)

where:

$$\text{TqPwrLimit} = [\text{Minimum}(\text{PwrLimit } 64, (\text{TqLimit } 65 * \text{motor speed } 84 * K1)) * K2]/\text{dc\_bus\_voltage } 82$$

where:

PwrLimit 64=a variable power limit,

TqLimit 65=a variable for torque limit,

K1=scaling constant, and

K2=fn(motor speed)=efficiency variable $$\text{if (motor speed } 84 < K3 \text{ rpm) motor\_flux} = \text{motor\_flux\_ref } 78 \text{ or else motor\_flux} = \text{motor\_flux\_fb } 80$$

where K3=calibration constant for motor speed.

$$\text{Commandl} = [\text{IqTqCommand } 60 * \text{motor\_flux} * \text{motor speed } 84 * K4]/\text{dc\_bus\_voltage } 82$$

where K4=fn(motor speed)=efficiency variable. The calculations and logic for the feed-forward ibat limitation block 54 are as follows:

$$\text{IqTqLim } 68 = \text{Minimum}(\text{IqTqCommand } 60, \text{IqTqClamp})$$

Where (for demonstration only):

$$\text{if (motor speed } 84 < 1850 \text{ rpm) motor\_flux} = \text{motor\_flux\_ref } 78 \text{ or else motor\_flux} = \text{motor\_flux\_fb } 80$$

$$\text{IqTqClamp} = \{[\text{dc\_bus\_current\_target } 70 * \text{dc\_bus\_voltage } 82/\text{motor speed } 84/\text{motor-flux}) * K5$$

where K5=fn(motor speed)=efficiency variable. There also is logic included that removes this clamp at a calibratable low speed, applies this clamp at a calibratable high speed, and blends it in/out at speeds in-between. The ibat feedback regulation block 56 is a Pi controller that acts on the difference between dc_bus_current_target 70 and dc_bus_current_fb 86, to modify IqTqLim 68 to produce IqTqRegula 72.

This method as applied to an AC Induction Motor Drive System operating with a Fuel Cell System as described within provides a successful driver feel and electric operation.

Although this invention has been described and illustrated in detail, it is to be clearly understood that this description is not to be taken by way of limitation. The spirit and scope of the invention are to be limited only by the terms of the appended claims.

I claim:

1. A process for controlling an electric motor drive system, comprising the steps of:

reading vehicle sensors to determine driver torque demand;

calculating motor current demand (load) for an electric driving motor, based on the driver torque demand;

calculating a desired current output for a load-dependent current generating system based on said desired values for motor current demand;

calculating available current output from the load-dependent current generating system; and supplying current from the load-dependent generating system to the electric driving motor.

2. The process of claim 1 further comprising the step of matching the desired current output with the available current output.

3. The process of claim 1 wherein the vehicle sensors comprise:

sensing accelerator position;

sensing brake position;

sensing key on;

sensing gear selector position; and sensing load-dependent current generating system temperature.

4. The process of claim 1 wherein the load-dependent current generating system is a fuel cell.

5. The process of claim 1 wherein the drive motor is any electric traction motor.

6. The process of claim 1 wherein the drive motor is an alternating current induction motor.

7. A system to control an electric motor drive system, comprising:

a system to read vehicle sensors to determine driver torque demand;

a system to calculate motor current demand (load) for an electric driving motor, based on the driver torque demand;

a system to calculate a desired current output for a load-dependent current generating system based on said desired values for motor current demand;

a system to calculate available current output from the load-dependent current generating system; and a system to supply current from the load-dependent generating system to the electric driving motor.

8. The system of claim 7 further comprising a system to match the desired current output with the available current output.

9. The system of claim 7 wherein the vehicle sensors comprise sensors for:

accelerator position;

brake position;

key on;

gear selector position; and load-dependent current generating system temperature.

10. The system of claim 7 wherein the load-dependent current generating system is a fuel cell.

11. The system of claim 7 wherein the drive motor is any electric traction motor.

12. The system of claim 7 wherein the drive motor is an alternating current induction motor.

* * * * *